US012640957B2

(12) United States Patent
Kryszak et al.

(10) Patent No.: US 12,640,957 B2
(45) Date of Patent: May 26, 2026

(54) BRANDING AND CONFIGURING DEVICES DEPLOYED IN A COMMUNICATION NETWORK OF A VEHICLE

(71) Applicant: GM GLOBAL TECHNOLOGY OPERATIONS LLC, Detroit, MI (US)

(72) Inventors: Andrew Kryszak, Madison Heights, MI (US); Subhash Vijaya Doddachikkaveeranna, Troy, MI (US); Chang Liu, Ann Arbor, MI (US); Anup Dhote, Auburn Hills, MI (US); Michael Potts, Lenox Township, MI (US); Daniel Pinheiro Carlesimo, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 335 days.

(21) Appl. No.: 18/383,289

(22) Filed: Oct. 24, 2023

(65) Prior Publication Data

US 2025/0132947 A1 Apr. 24, 2025

(51) Int. Cl.
*H04L 12/40* (2006.01)

(52) U.S. Cl.
CPC .................. *H04L 12/40006* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 2004/0254689 A1 | 12/2004 | Blazic et al. | |
| 2007/0171918 A1* | 7/2007 | Ota ..................... | H04L 12/2856 |
| | | | 370/389 |
| 2017/0033986 A1 | 2/2017 | Anderson et al. | |
| 2020/0213195 A1* | 7/2020 | Krieger .............. | H04L 12/1881 |
| 2023/0283680 A1* | 9/2023 | Krakovszki ............ | H04L 67/51 |
| | | | 709/220 |

FOREIGN PATENT DOCUMENTS

| | | |
|---|---|---|
| DE | 102017212256 A1 | 1/2019 |
| DE | 102020209221 A1 | 1/2022 |

OTHER PUBLICATIONS

Office Action dated May 22, 2024 from German Patent Office for German Patent No. 102023136008.6; 9pgs.

* cited by examiner

*Primary Examiner* — Benjamin Lamont

(57) ABSTRACT
A branding and configuring system for devices of a vehicle to be branded includes: an Ethernet switch including ports; a branding module connected to the Ethernet switch and generating new identification information for each of the devices and send the new identification information via a respective one of the ports to that device; and the devices connected respectively to the ports and including a RAM and a NVM. Each of the devices is configured to: store the corresponding new identification information received from the branding module for that device in the RAM or replace identification information stored in the RAM of that device with the corresponding new identification information in the RAM; and based on the new identification information, receive programming from a testing device external from the vehicle to reprogram that device for a dedicated functional role within the vehicle.

20 Claims, 7 Drawing Sheets

BRANDING AND CONFIGURING DEVICES DEPLOYED IN A COMMUNICATION NETWORK OF A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to devices within a communication network of a vehicle, and more particularly to branding and configuring the devices for respective applications.

A vehicle can include various systems, such as: a body control system; a chassis control system including a propulsion system, a braking system, a steering system; an infotainment system; a navigation system; etc. Each of the systems can include respective sensors, actuators, and controllers (electronic control units (ECUs)). Each of the controllers has corresponding hardware and software for the application of the controller. For example, a chassis controller includes i) hardware for receiving inputs from chassis related sensors and ii) drivers for controlling one or more actuators, such as motors, pumps, etc. based on outputs of the sensors. Each system including the corresponding controller, sensors, and actuators has a dedicated function and the controller is located in a dedicated location within the vehicle.

SUMMARY

A branding and configuring system for multiple devices of a vehicle to be branded is disclosed. The branding and configuring system includes: at least one Ethernet switch including multiple ports; a branding module connected to the at least one Ethernet switch and configured to generate new identification information for each of the devices and send the new identification information via a respective one of the ports to that device; and the devices connected respectively to the ports and including a random access memory (RAM) and a non-volatile memory (NVM). Each of the devices is configured to i) at least one of store the corresponding new identification information received from the branding module for that device in the RAM and replace identification information stored in the RAM of that device with the corresponding new identification information in the RAM, ii) based on the new identification information, receive programming from a testing device external from the vehicle to reprogram that device for a dedicated functional role within the vehicle, and ill) perform a confirmation process and based on results of the confirmation process, store the corresponding new identification information and the programming in the NVM of that device.

In other features, the devices include the same hardware and, prior to branding and configuring, the same software.

In other features, at least one of the devices includes different hardware than another one of the devices.

In other features, the branding module sends the new identification information for the devices to the devices via the Ethernet switch concurrently.

In other features, the Ethernet switch is configured, based on ternary content-addressable memory rules, to route the new identification information and other messages to the devices via the ports.

In other features, the Ethernet switch is configured to route the new identification information and other messages to the devices via the ports based on user datagram protocol identifiers of the ports, which are dedicated respectively for the devices as a result of being connected to the ports.

In other features, the ports include first connectors. The devices are connected to the ports via cables. The cables include second connectors that connect respectively to the first connectors. Each of the second connectors is compatible with only one of the first connectors.

In other features, the branding module is configured to transmit multicast packets or unicast packets to the devices. The at least one Ethernet switch is configured to route the multicast packets or the unicast packets to the ports based on user datagram protocol identifiers of the ports.

In other features, during a discovery phase: the branding module sends discovery requests to the devices; and each of the devices, i) based on a corresponding one of the discovery requests, checks if there is valid identity information stored in the NVM of that device, ii) if there is valid identity information, the device self-configures itself using information stored in the NVM of that device, and iii) if there is not valid identity information, the device loads a hardware identifier into the NVM of that device and self-selects a medium access control address, an Internet protocol address and a diagnostic identifier from a table stored in the NVM of that device.

In other features, the branding module is configured, subsequent to sending the discovery requests, to send to the devices branding configuration requests to indicate to the devices the new identification information of the devices. The devices are configured, based on the branding configuration requests, to change identification information of the devices with the new identification information.

In other features, the branding module is configured to receive from the testing device a branding status request, and respond to the testing device with status of each of the devices. The devices are configured, based on signals received from the testing device in response to the status of each of the devices, to reprogram the devices.

In other features, the devices receive signals from the testing device according to a unified diagnostic service protocol to reprogram the devices.

In other features, a method of branding and configuring devices of a vehicle to be branded is disclosed. The devices include a RAM and a NVM. The method including: generating new identification information at a branding module for each of the devices and sending the new identification information via a respective one of a ports of at least one Ethernet switch to that device, where the devices are connected respectively to the ports; and via each of the devices, i) at least one of storing the corresponding new identification information received from the branding module for that device in the RAM and replace identification information stored in the RAM of that device with the corresponding new identification information in the RAM, ii) based on the new identification information, receiving programming from a testing device external from the vehicle to reprogram that device for a dedicated functional role within the vehicle, and iii) performing a confirmation process and based on results of the confirmation process, store the corresponding new identification information and the programming in the NVM of that device.

In other features, the method further includes sending the new identification information for the devices to the devices via the Ethernet switch concurrently.

In other features, the method further includes based on ternary content-addressable memory rules, routing the new identification information and other messages to the devices via the ports.

In other features, the method further includes routing the new identification information and other messages to the devices via the ports based on user datagram protocol identifiers of the ports, which are dedicated respectively for the devices as a result of being connected to the ports.

In other features, the ports include first connectors. The devices are connected to the ports via cables. The cables include second connectors that connect respectively to the first connectors. Each of the second connectors is compatible with only one of the first connectors.

In other features, the method further includes: transmitting multicast packets or unicast packets to the devices; and routing, via the at least one Ethernet switch, the multicast packets or the unicast packets to the ports based on user datagram protocol identifiers of the ports.

In other features, the method further includes, during a discovery phase: sending discovery requests to the devices; via each of the devices and based on a corresponding one of the discovery requests, checking if there is valid identity information stored in the NVM of that device, if there is valid identity information, self-configuring that device using information stored in the NVM of that device, if there is not valid identity information, loading a hardware identifier into the NVM of that device and self-selecting a medium access control address, an Internet protocol address and a diagnostic identifier from a table stored in the NVM of that device; subsequent to sending the discovery requests, sending to the devices branding configuration requests to indicate to the devices the new identification information of the devices; and via the devices and based on the branding configuration requests, changing identification information of the devices with the new identification information.

In other features, the method further includes: receiving from the testing device a branding status request at the branding module, and responding to the testing device with status of each of the devices; and based on signals received from the testing device in response to the status of each of the devices, reprogramming the devices.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
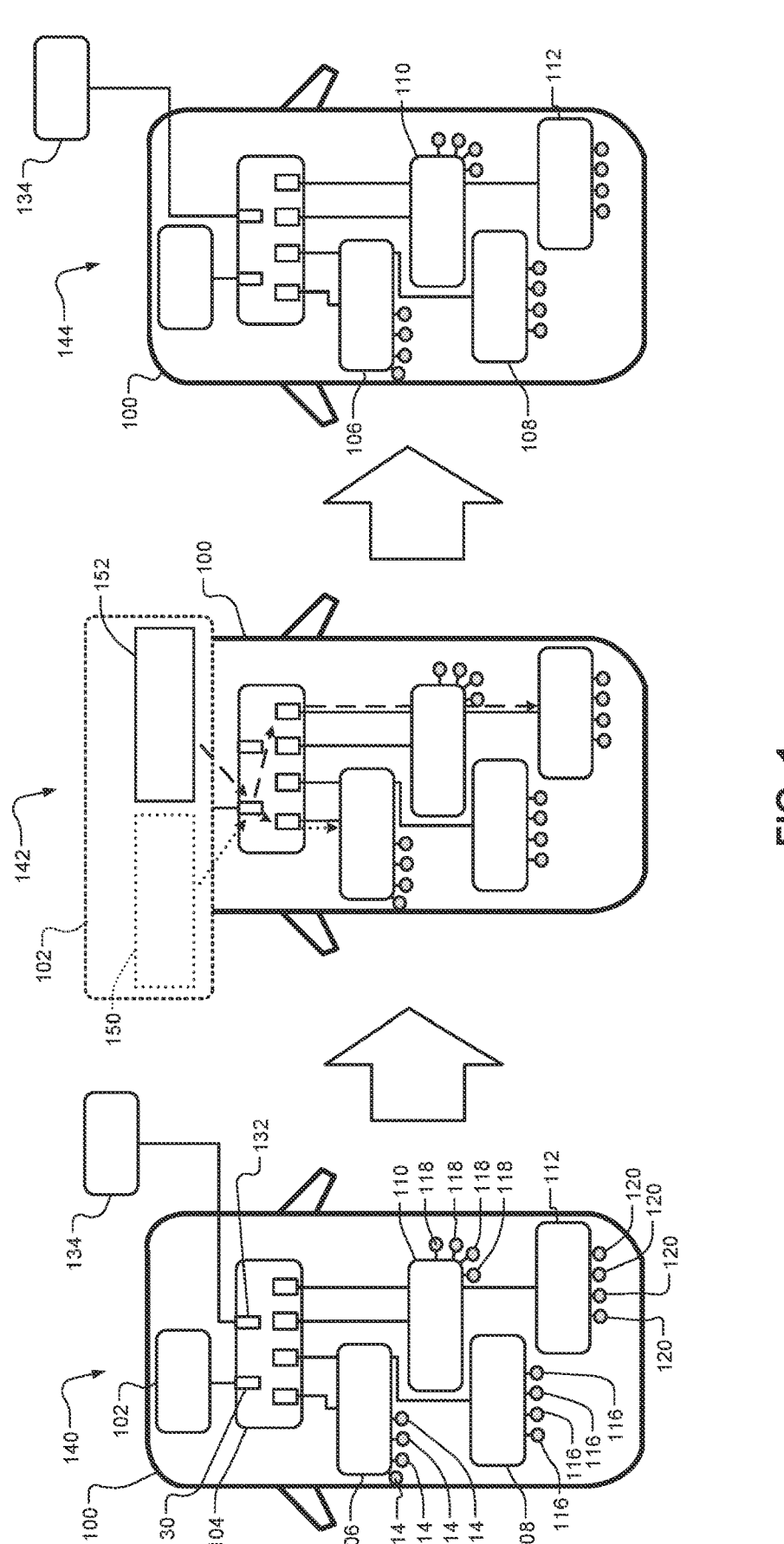
FIG. 1 is a functional block diagram illustrating an example branding and configuring process for devices within a vehicle having an Ethernet network topology in accordance with the present disclosure.

It is costly to manufacture a vehicle having multiple controllers (or ECUs) with respective hardware and software. This is due to the number of different controllers and different types of software involved and the complexities of integrating the controllers in a single vehicle. Connecting different controllers to each other and to sensors and actuators within the vehicle as part of a local area network (LAN) and configuring the controllers to communicate with each other, the sensors the actuators, and a testing device external to the vehicle is complex.

The examples set forth herein including branding and configuring systems and methods for branding and configuring devices, such as controllers and other electronic devices. Devices being branded are referred to as unbranded devices and devices that have been branded are referred to as branded devices. Branding includes determining an intended application for each unbranded device and providing that device with the correct identification information, such as the correct medium access control (MAC) address, Internet protocol (IP) address, diagnostic identifier (ID), etc. The correct identification information replaces default identification information stored in the unbranded device when manufactured. In an embodiment, a vehicle is provided with multiple controllers having the same part number and thus the same hardware and software. The controllers are branded and configured for respective intended applications. When configured, the controllers are provided with the programming for the intended applications. As an example, a body controller is provided with body programming, a chassis controller is provided with chassis programming, etc. This occurs within the vehicle after the controllers are installed. The problem with configuring multiple devices with the same or similar hardware design re-instantiated in a same vehicle is solved by a disclosed branding method of dynamic device configuration after devices are plugged into a vehicle Ethernet network. This includes configuring a device with a device specific and dedicated identity such as a MAC address, an IP address, and a diagnostic identifier, and with device specific and dedicated software content (or programming) based on the specific functional role of that device within the vehicle. The examples are also applicable to vehicles having two or more controllers with different part numbers, calibration, hardware, and/or software.

Dynamically branding and configuring multiple devices (e.g., controllers) is a complex problem. At high level, the examples disclosed herein provide: 1) a vehicle Ethernet network topology and the specific usage of Ethernet switch (es) to support the branding and configuring processes; 2) an overall branding and configuring strategy; and 3) software algorithms and detailed communication data to accomplish the branding and configuring processes. With regards to item 1, a topology is disclosed that includes i) a branding module, ii) an Ethernet switch, iii) the devices to be branded, which may be referred to as branding clients, and iv) an external testing device. The testing device is connected to the vehicle network and is used to provide the stated programming when configuring the devices. Each port of the Ethernet switch dictates the role of the branding client connected to the Ethernet switch, as further described below. The branding process may be triggered by the testing device or automatically initiated by the branding module. The branding and configuring process includes discovery, reprogramming, and confirmation phases. In an embodiment, the devices are reprogrammed concurrently to reduce manufacturing time.

Software algorithms are disclosed that are executed by the branding module and branding clients. Specific usage of ternary content-addressable memory (TCAM) rules are defined herein including rules for virtual local area network (VLAN) membership and communication data payload transmission over user datagram protocol (UDP) sockets (or connectors) to dynamically assign MAC addresses, IP addresses, UDP port numbers and diagnostic identifiers using multicast and/or unicast Ethernet frames. The request/response handshaking between the branding module and branding clients is also defined herein.

FIG. 1 shows a branding and configuring process for devices within a vehicle 100 having an Ethernet network topology. The vehicle 100 includes a branding module (may be referred to as branding manager) 102, an Ethernet switch 104, and devices 106, 108, 110, 112. The device 106 is connected to sensors and/or actuators 114. The device 108 is connected to sensors and/or actuators 116. The device 110 is connected to sensors and/or actuators 118. The device 112 is connected to sensors and/or actuators 120. The Ethernet switch 104 has a first port 130 connected to the branding module 102, a second port 132 connected to a testing device (or diagnostic tester) 134, and ports A-D connected respectively to the devices 106, 108, 110, 112. In an embodiment, the devices 106, 108, 110, 112 are controllers having a same part number, same hardware, and same initial software. Any number of devices may be included on the vehicle and connected to a respective port of the Ethernet switch, and branded and configured as disclosed herein. In an embodiment, one or more of the devices has a different part number, hardware and/or initial software than one or more of the other devices being branded and configured. In an embodiment, the vehicle 100 includes more than one Ethernet switch. Each Ethernet switch may be connected to the branding module, the testing device, another Ethernet switch, and/or one or more devices being branded and configured.

The branding and configuring process includes an initial phase 140 when the devices to be branded and configured are installed and are in initial default states having initial default identification information, software and programming. A discovery branding phase is then performed and the devices are branded, designated as phase 142. The branded devices are then configured, designated as phase 144.

The vehicle Ethernet network topology supports the branding and configuring process. The devices that are to be branded behave as branding clients that are connected to the branding module 102 through one or more Ethernet switches (one Ethernet switch 104 is shown). Multiple Ethernet switches may be cascaded in the Ethernet network topology, as long as the branding module 102, the branding clients 106, 108, 110, 112, and the testing device 134 are connected. In an embodiment, the Ethernet switch(es) are integrated as part of the branding module 102 or as part of one of the branding clients 106, 108, 110, 112. The Ethernet switch(es) may be standalone switch(es) in the vehicle Ethernet network. The testing device 134 is connected to the same Ethernet network and communicates with the branding module 102 and branding clients 106, 108, 110, 112 using a standard diagnostic protocol such as the unified diagnostic service (UDS). In an embodiment, the testing device 134 knows the identification information for each of the devices 106, 108, 110, 112 based on at least one of the ports that the devices 106, 108, 110, 112 are plugged into. In another embodiment, the testing device 134 does not necessarily know where a certain device is plugged into. In an embodiment, the testing device 134 does not know where the devices 106, 108, etc. are plugged into but does know whether the devices 106, 108, etc. are present on the vehicle. The branding module 102 ensures that the devices 106, 108, etc. are branded with the proper IDs such that the testing device 134 is able to communicate with and program the devices 106, 108, etc.

The functional role of each of the branding clients 106, 108, 110, 112 is determined by which switch port that branding client is connected to. After being plugged into one of the switch ports (e.g., one of the ports A-D), that device is branded and programmed for the functional role associated with that port. In other words, the port of the Ethernet switch 104 dictates the functional role of the branding client connected to that port. For example, the port A may be dedicated as a body control port, port B may be dedicated as a chassis control port, port C, may be dedicated as an infotainment port, port D may be dedicated as a navigation system port, etc. The devices connected to these ports perform the functional role associated with that port. As an example, device 106 performs the functional role as a body control module, device 108 performs the functional role as the chassis control module, device 110 performs the functional role as the infotainment control module, and device 112 performs the functional role as the navigation control module. In one embodiment, the functional roles of the devices 106, 108, 110 and 112 go across different domains. In another embodiment, the functional roles of the devices 106, 108, 110, 112 are domain-agnostic and thus are designed to optimize specific vehicle zones, yet still preserving unique physical and functional partitioning and allocation strategies that differentiate them from one another. Devices may be rebranded and reconfigured if removed from one port and connected to another port of the Ethernet switch 104.

Figure 2:
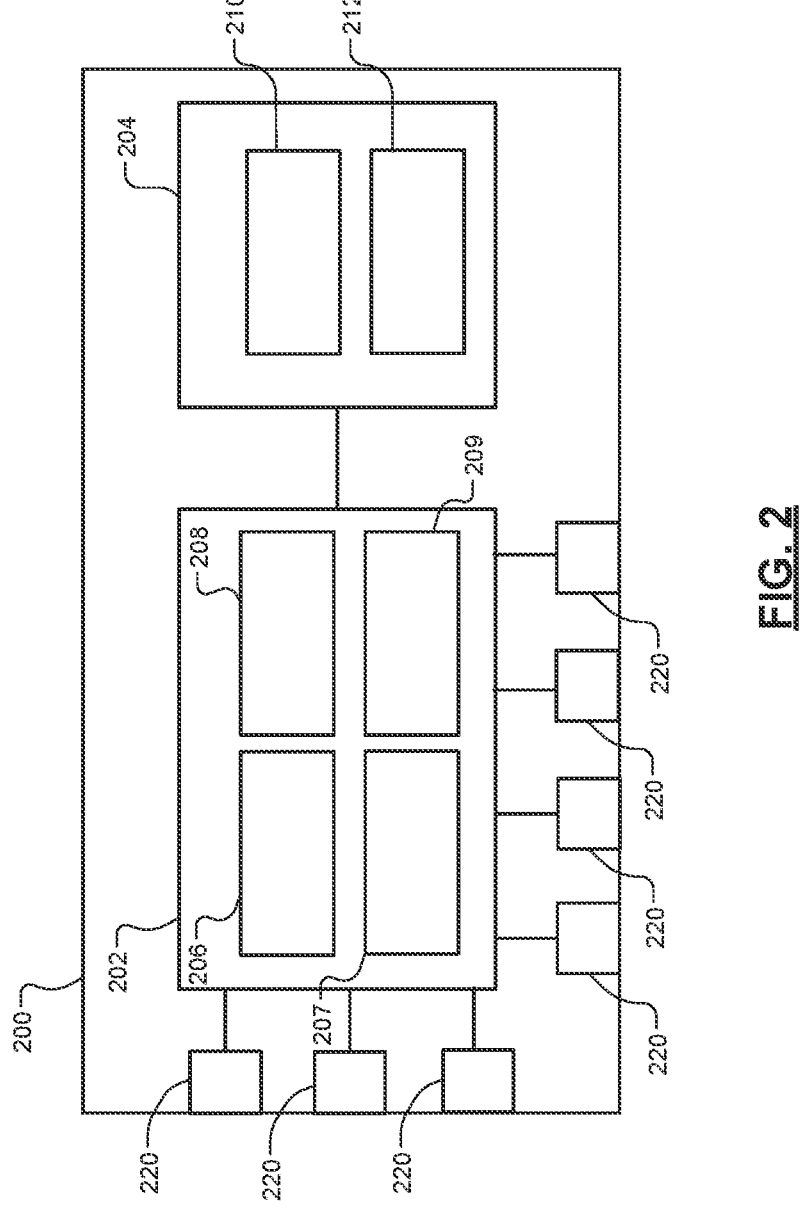
FIG. 2 is a functional block diagram of an example device to be branded and configured in accordance with the present disclosure.

FIG. 2 shows a device 200 that is a representative example of any of the devices 106, 108, 110, 112 of FIG. 1. The device 200 may include a control module 202 and a memory 204. The control module 202 may include various circuits and components 206, drivers 207, inputs 208, and reference terminals 209, such as: high-side drivers; low-side drivers; discrete inputs; analog inputs; pulse width modulation (PWM) inputs; half bridge rectifiers; return, reference, battery, and ground terminals; serial data devices; specialty terminals (e.g., audio terminals, antenna terminals, or other terminals), etc. The control module 202 may receive analog inputs and/or discrete inputs. The memory 204 may include random access memory (RAM) 210 and non-volatile memory (e.g., flash memory) 212. The RAM 210 may be included in the control module 202. The control module 202 may include and/or be connected to any number of ports 220. One of the ports 220 may be connected to the first port 130 of the Ethernet switch 104 of FIG. 1. The other ports 220 may be connected to respective sensors and/or actuators. The other ports may include standard mechanical ports, controller area network (CAN) bus ports, local interconnect network (LIN) bus ports, etc. The other ports may include Ethernet ports or non-Ethernet ports. In an embodiment, the other ports include one or more Ethernet ports connected to one or more sensors or actuators. The sensors and actuators may be connected to, controlled by, and/or driven by corresponding ones of the circuits and components 206, the drivers 207, inputs 208, and/or the terminals 209. As an example, a discrete switch may interface with a discrete input of the control module 202. An analog switch (e.g., a resistor ladder) may interface with an analog input of the control module 202. The device 200 may be reprogrammed for loads such as the sensors and actuators during the branding and configuring processes disclosed herein.

Figure 3:
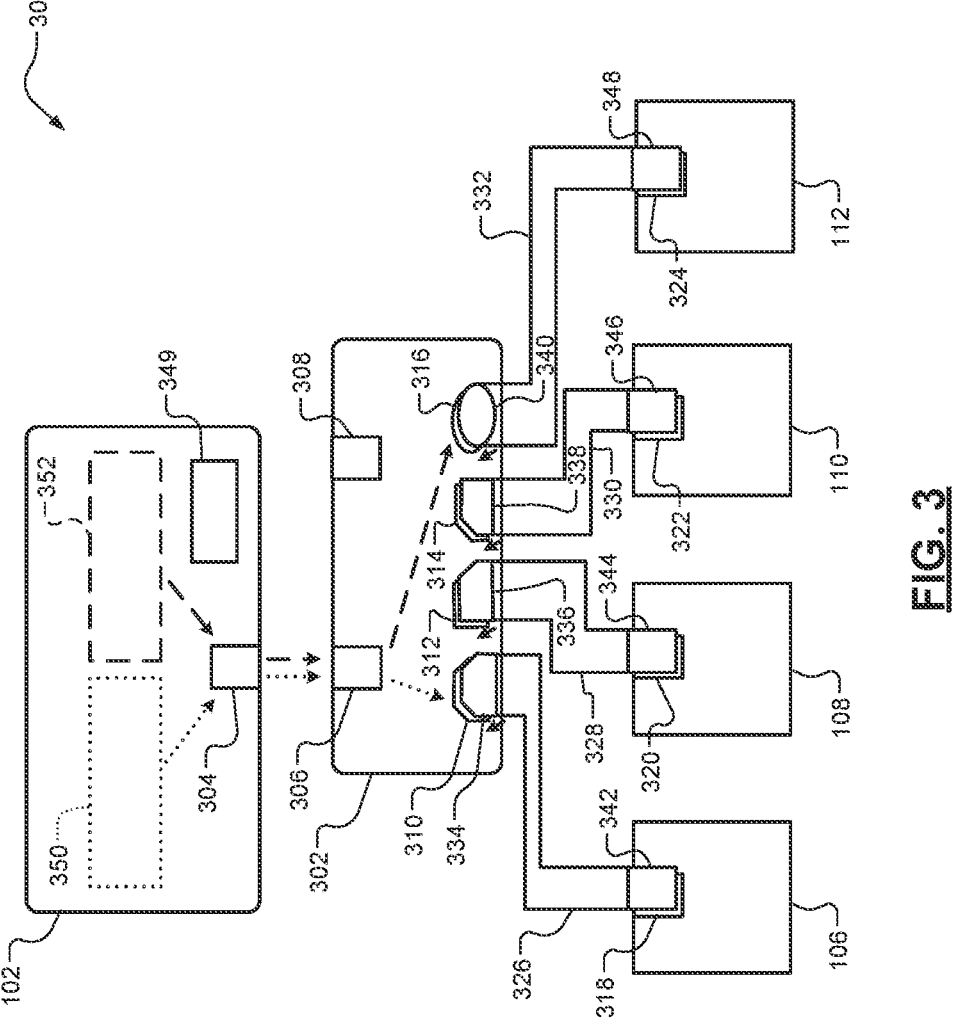
FIG. 3 is a functional block diagram of a branding module, Ethernet switch, and unbranded devices of an example Ethernet network topology in accordance with the present disclosure.

FIG. 3 shows an Ethernet network topology 300 that includes the branding module 102, an Ethernet switch 302, and the unbranded devices 106, 108, 110, 112. The branding module 102 includes port 304, which is connected to a first port 306 of the Ethernet switch 302. The Ethernet switch 302 further includes a second port 308 and device ports 310, 312, 314, 316, which are connected to respective connectors of the ports 318, 320, 322, 324 (also labeled A-D) of the devices 106, 108, 110, 112 via cables 326, 328, 330, 332. Ports A-D of FIG. 1 may be configured similarly as the ports 318, 320, 322, 324. The cables 326, 328, 330, 332 include first connectors 334, 336, 338, 340 and second connectors 342, 344, 346, 348. The branding module 102 further includes a manufacturer's enable counter (MEC) 349, which is further described below.

The examples provided herein also include physical system-defined configuration assurance, leveraging error proofing, and connector polarity to avoid swapping locations of devices and ports. Each port is associated with a particular location of a device in the vehicle. For example, port A is associated with a first location of a device connected to port A, port B is associated with a second location of a device connected to port B, port C is associated with a third location of a device connected to port C, and port D is associated with a fourth location of a device connected to port D. Whichever device is at the location associated with port A is connected to port A. This is assured by a cable having a connector that is compatible with a connector of port A and the cable being at a dedicated location within the vehicle. The cables for the other devices that connect to ports B, C and D do not have connectors compatible with port A. This holds true for each of the ports A-D, which have designated connectors. As shown in FIG. 3, each of the first connectors 334, 336, 338, 340 is compatible with a respective one of the connectors of one the ports 310, 312, 314, 316 and not with another one of the connectors of the other ones of the ports 310, 312, 314, 316.

The second connectors 342, 344, 346, 348 are the same and may connect to any of the devices 106, 108, 110, 112. Although each of the devices 106, 108, 110, 112 may connect to any one of the connectors 342, 344, 346, 348, the one of the devices 106, 108, 110, 112 that is located at the designated location of one of the connectors of one of the ports 318, 320, 322, 324 is connected to that connector and takes on the functional role associated with the one of the ports 310, 312, 314, 316, which is connected to that connector via a corresponding one of the cables 326, 328, 330, 332. In other words, the functional roles of the devices 106, 108, 110, 112 is dependent respectively on the placed locations of the devices 106, 108, 110, 112 within the vehicle and thus to which of the cables 326, 328, 330, 332 the devices 106, 108, 110, 112 are connected.

In a traditional system, there can be a high probability of connections between cables of devices and ports of an Ethernet switch being swapped during manufacturing. To prevent this, the ports 310, 312, 314, 316 have different connector designs that match and are compatible with the designs respectively of the connectors 334, 336, 338, 340 to minimize risk of connection mistakes of the devices during and/or post vehicle manufacturing. There is a low probability of swapping devices and connectors of the cables due to the specific locations of the devices in the vehicle.

The Ethernet switches disclosed herein implement TCAM rules for determining destination ports of received frames. For example, with respect to FIG. 3, the Ethernet switch 302 sends frames received from the branding module 102 via the port 306 to the ports 310, 312, 314, 316 based on the TCAM rules. The frames may be multicast frames or unicast frames. In an embodiment, the TCAM rules direct multicast frames and unicast frames to only a selected one of the ports 310, 312, 314, 316. This may be done based on UDP destinations indicated by the frames. For example, frames intended to brand the device connected to port 310 are only sent to port 310. In another embodiment, the TCAM rules direct the multicast frames or unicast frames to the ports 310, 312, 314, 316. Each of the ports 310, 312, 314, 316 receives the multicast frames or unicast frames for that port. In this example, each of the devices 106, 108, 110, 112 only accepts the frames directed to the port of that device. Each of the devices 106, 108, 110, 112 may listen for all frames (or packets) transmitted from the branding module 102 but may only receive the frames (or packets) for the port the device is plugged into.

In the examples of FIGS. 1 and 3, the branding module 102 is shown as sending two multicast frames (or signals) to two UDP ports. In FIG. 1, the signals are designated 150, 152. In FIG. 3, the signals are designated 350, 352. The UDP ports may have UDP identifiers of, for example, '101' and '104'. The frames for UDP port 101 are sent to the Ethernet switches 104, 302, which then transfers them to the respective one of the ports A-D associated with UDP ports 101, 104 (e.g., ports A and D), as shown.

Figure 4:
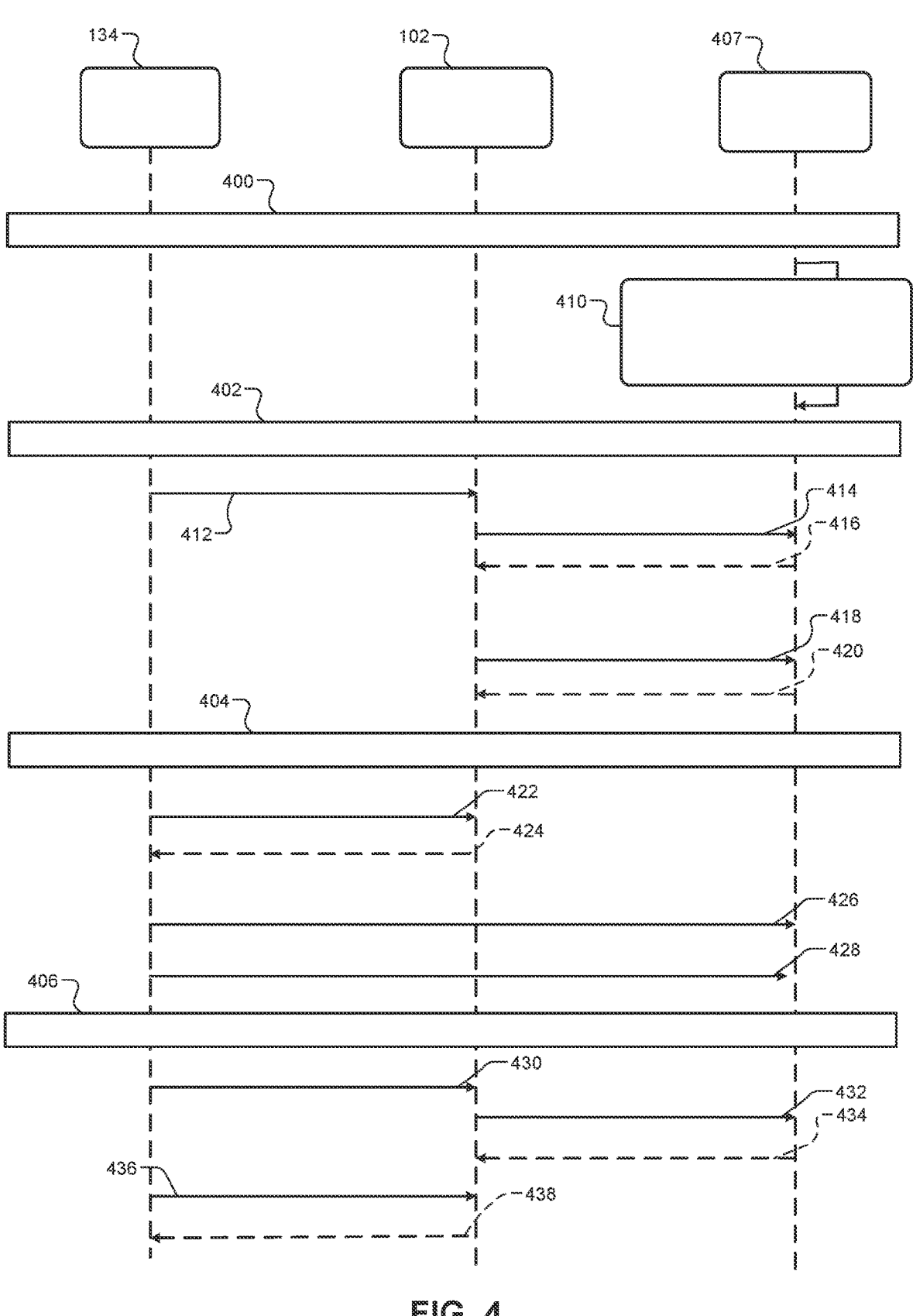
FIG. 4 is a signal flow diagram illustrating an example branding and configuring process in accordance with the present disclosure.

FIG. 4 shows a signal flow diagram illustrating an example branding and configuring process, which includes a self-identifying phase 400, a discovery phase 402, a reprogramming phase 404, and a confirmation phase 406. Although the process is described primarily with respect to the examples of FIGS. 1-3, the process is applicable to other in-vehicle Ethernet network topologies. The branding module 102 is programmed from factory with software and calibrations providing knowledge of how the devices (e.g., devices 106, 108, 110, 112) are branded. Each of the devices may be a microcontroller unit (MCU).

During the self-identifying phase 400, each of the devices (e.g., devices 106, 108, 110, 112) connected to the Ethernet switch (e.g., Ethernet switch 104, 302) checks that device's hardware part number and/or NVM partition, which indicates the device's initial default addresses and identifiers including MAC and IP addresses and diagnostic identifier. For example purposes, the branding and configurating process is described with respect to a single device 407, which may be any of the devices 106, 108, 110, 112 or other device. This is designated as 410.

During the discovery phase 402, the branding module 102 of FIGS. 1 and 3 brands the devices with unique hardware IDs, with the same hardware ID, or a combination of both. The discovery phase runs automatically when the branding module's MEC 349 is greater than 0. The MEC 349 may be greater than zero when the vehicle is, for example, not with a customer and is being manufactured, in route to a dealer, or is at a dealer. When the MEC 349 is zero, the branding module 102 is only triggered by a routine ID (RID) from the testing device 134, designated as signal 412.

The branding module 102 sends multicast discovery requests to each of the devices, one of which is designated 414. The branding module 102 sends the discovery requests to ensure the presence of the devices and to retrieve the current identifiers of the devices. Each multicast request includes a unique UDP port number and is routed only to a specific Ethernet output switch port base on the TCAM rules defined in the Ethernet switch and/or in the Ethernet output switch port. Since each request has a corresponding unique UDP port number, when the request reaches device 407, the device 407 knows what UDP port should be used to respond back to the branding module 102 in response to the received request. A discovery response from the device 407 is designated 416.

The device 407 checks if there is valid identity information (e.g., MAC address, IP address, and diagnostic ID) in the NVM of the device 407, if there is valid identity information stored in the NVM, the device 407 self-configures itself using the identity information stored in the NVM. If there is not valid identity information stored in the NVM, the device 407 loads the hardware ID of the device 407 from the NVM and then self-selects the respective MAC address, IP address, and diagnostic ID from a lookup table stored in the NVM of the device 407. The device 407 responds to branding module's discovery request 414 with the self-selected branding identity of the device 407 using the UDP port number received from the discovery request. The UDP port number is included in the discovery response 416. The discovery response 416 may include the MAC address, IP address, diagnostic ID, status bits, and hardware ID. The status bits indicate whether the device is programmed or unprogrammed. The device 407 operates in a boot mode during the discovery phase 402 and runs in an application mode when the vehicle is with a customer and is powered on.

The branding module 102 receives the responses from the devices and then sends the multicast branding configuration requests to the devices to let the devices know their expected identities (e.g., MAC address, IP address, diagnostic ID, and/or other identification information). Each multicast branding configuration request is only routed to a specific switch port based on the TCAM rules defined in the Ethernet switch. A configuration request 418 is shown and may include the MAC address, IP address, diagnostic ID, and status bits. The status bit may indicate that the device is unprogrammed. Each device receives the multicast branding configuration request and will change their identities (e.g., MAC address, IP address, diagnostic ID, and/or other identification information) accordingly but the new identity information is initially stored in RAM and is not stored in NVM of the devices. This is because if later the reprogramming phase fails for one of the devices that device reverts back to its original unbranded state or previously branded state. Each device after matching its identity with the new configuration request, sends a configuration response back to the branding module 102 to confirm the completion of the branding discovery phase. A configuration response is designated 420 and may include the MAC address, IP address, diagnostic ID, and status bits. The status bit may indicate that the device is unprogrammed.

During the reprogramming phase 404, the testing device 134 sends a branding status request, designated 422, to the branding module 102. The branding module 102 responds to the testing device 134 with the status of all the devices (i.e., all brandable devices or devices to be branded). A branding status response is designated 424. The branding status response 424 indicates which devices are ready to be programmed. If one of the devices is invalid, meaning the device should not be programmed, then the branding status response 424 indicates this information. The status information was previously collected during the discovery phase 402.

Based on the branding status of the devices reported by the branding module, the testing device 134 initiates a device flash reprogramming operation concurrently for each of the devices that have not been programmed to configure (or program) the devices. This may include, for example and for each of the devices, storing the identity information and software including a program for the functional role of that device in the NVM of that device. The program is later executed by that device when implementing that functional role. This programming is represented by signal 426 and may include diagnostic programming and calibration and switch binaries. Since the devices have already been configured with the appropriate identity information (e.g., MAC address, IP address, diagnostic ID, and/or other identification information) in RAM of the devices, the testing device 134 is able to communicate with each of the devices using the UDS over static defined socket (or connector) to perform the flash reprogramming. After flash reprogramming, the devices have been branded with the identity information stored in their flash (I.e., NVM) memory. At the end of the flash reprogramming phase, the testing device 134 issues a reset request to each of the devices. A reset request is designated 428. A reset may include powering down and back up the device.

During the confirmation phase 406, the testing device 134 re-issues the branding discovery RID and the branding module 102 collects again the branding statuses of the devices. An RID request signal is shown and is designated 430. Another discovery request signal is sent from the branding module 102 to the devices, one of which is designated 432. The devices respond with discovery response signals, one of which is designated 434. The discovery response signals may include the MAC address, IP address, diagnostic ID, and status bits of the devices. The status devices of the programmed device indicate that the devices are programmed. Then the testing device 134 sends a brand status request 436 to the branding module 102 and the branding module 102 reports the collected branding statuses to the testing device 134. A branding status response signal 438 is shown. The testing device 134 determine whether all of the devices have been branded and programmed successfully and whether reprogramming should be performed for any of the devices. If reprogramming should be performed for any of the devices, the branding, reprogramming and confirmation phases 402, 404, 406 may be repeated for the devices that were not branded and reprogrammed successfully.

Additional Discovery Phase Details

Referring again to FIGS. 1 and 3, the branding module 102, the testing device 134 and the devices being branded include software algorithms to perform the branding a configuring process. The branding module 102 and devices to be branded communicate on a dedicated branding VLAN (e.g., VLAN 2). The branding module 102 sends multicast IP-UDP messages, for example the discovery and configuration requests, to the devices to be branded. The destination UDP port number for a branding message is chosen by the branding module 102 based on the physical location of the device to be branded (e.g., 01:00:5e: 40:00:00-239.192.0.0-101). The devices to be branded open a set of IP-UDP sockets (or connectors) to listen for the discovery and configuration requests sent by the branding module 102 (e.g., 239.192.0.0-101/102/103/104/etc.). The discovery request is utilized to ensure the presence of the device and receive knowledge of the device's current configuration. The configuration request is utilized to instruct the correct MAC address, IP Address, diagnostic ID, and branding and configuring status.

The Ethernet Switch forwards each of the multicast requests from the branding module 102 to only the designated Ethernet switch port based on the destination address and UDP port number for that request. This is achieved according to the TCAM rules stored inside the Ethernet switch. The Ethernet switch, based on the TCAM rules, inspects and determines the branding multicast and UDP port number of a received frame, and directs the frame to the corresponding egress port of the Ethernet switch. Upon receiving a discovery request, the device sends a discovery response indicating the currently configured MAC address, IP Address, diagnostic ID, and branding status to the branding module 102. Upon receiving a configuration request from the branding module 102, the device modifies and confirms its configuration as instructed and then sends a configuration response indicating the newly configured/confirmed MAC address, IP Address, diagnostic ID, and branding status to the branding module 102.

Additional Branding Status Details

The status of the branding and configuring process are indicated throughout the process. As an example, a device, while being branded, maintains a branding status tag in the NVM of that device. A branding status of "Unbranded" indicates that the device has never been modified from its initial default configuration. A branding status of "Temporary/Ready for Programming" indicates that the device has temporarily modified its configuration as instructed due to a received branding configuration request, however the configuration will not become saved into the NVM of the device and is used in subsequent power cycles until diagnostic programming and calibration occurs.

A branding status of "Confirmed/Ready for Programming" indicates that the device's configuration already matches the configuration instructed via the branding configuration request, but diagnostic programming and calibration has not yet occurred. A branding status of "Programmed" indicates that the device has undergone diagnostic programming and calibration to save a new configuration into the NVM of that device. The device may contain a list of possible IDs that are valid from which the device may be branded to have. If a branding request commands an unknown/invalid ID, the device detects that the unknown/invalid ID is not in the possible ID list and responds back to the branding module 102 with status as "Invalid Request". The branding module 102 collects and maintains a list of the branding status responses from all the devices and stores them in memory of the branding module 102.

Additional Reprogramming Phase Details

The testing device 134 requests the branding module 102 to report the branding status of the devices to be branded.

The testing device initiates the reprogramming of the devices that still need to be branded using the predefined sockets (or connectors) that contain the proper MAC and IP addresses and diagnostic IDs for those devices. The testing device 134 reprograms the devices concurrently because each communication with one of the devices uses a separate, different and designated socket (or connector). The testing device 134 reprograms the device's software and calibration values. In an embodiment, if the device has its own firmware and configuration, it will be reprogrammed after the device's software and calibration updates. After reprogramming, the device also updates its branding tag in the NVM of the device.

Additional Confirmation Phase Details

After all the reprogramming is completed, the testing device 134 issues a device reset command to the devices that were reprogrammed. After reset, the testing device 134 and the branding module 102 re-collect the branding status again to confirm the branding process for the devices is successful, i.e., all the devices to be branded have identities and functional roles matching the expected identities and functional roles of the Ethernet switch ports to which the devices are connected.

Figure 5:
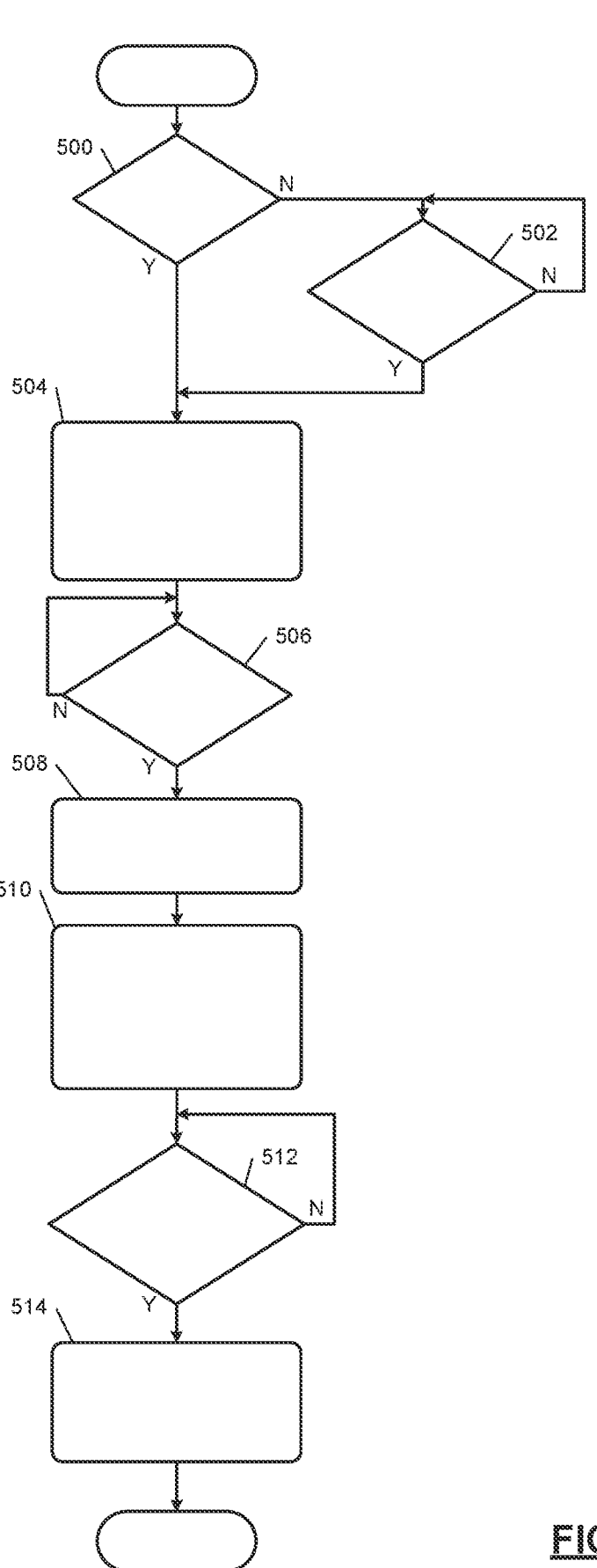
FIG. 5 illustrates an example branding method in accordance with the present disclosure.

FIG. 5 shows a branding method that may be implemented by the branding module 102 during the branding phase. At 500, the branding module 102 determines whether the MEC is greater than 0. If not, operation 502 is performed, otherwise operation 504 is performed.

At 502, the branding module 102 determines whether a RID has been received from the testing device 502. If yes, operation 504 is performed. At 504, the branding module 102 generates branding discovery requests (multicast or unicast requests) and sends the requests to the devices to be branded using different UDP ports. The requests are routed to respective ports based on TCAM rules.

At 506, the branding module 102 determines whether a discovery time period has elapsed from when the discovery phase began. If yes, operation 508 is performed. At 508, the branding module 102 generates or updates an existing table of information of the devices connected to the Ethernet switch and are either already branded or are being branded including generating or updating the identity information for each of the devices. At 510, the branding module 102, based on static information in the NVMs of the devices and/or NVM of the branding module 102, issues branding configuration requests to the devices being branded.

At 512, the branding module 102 determines whether the branding configuration period has expired. If yes, operation 514 is performed. At 514, the branding module 102 generates or updates a branding status table and responds to a RID if appropriate. The method may end subsequent to operation 514.

Figure 6:
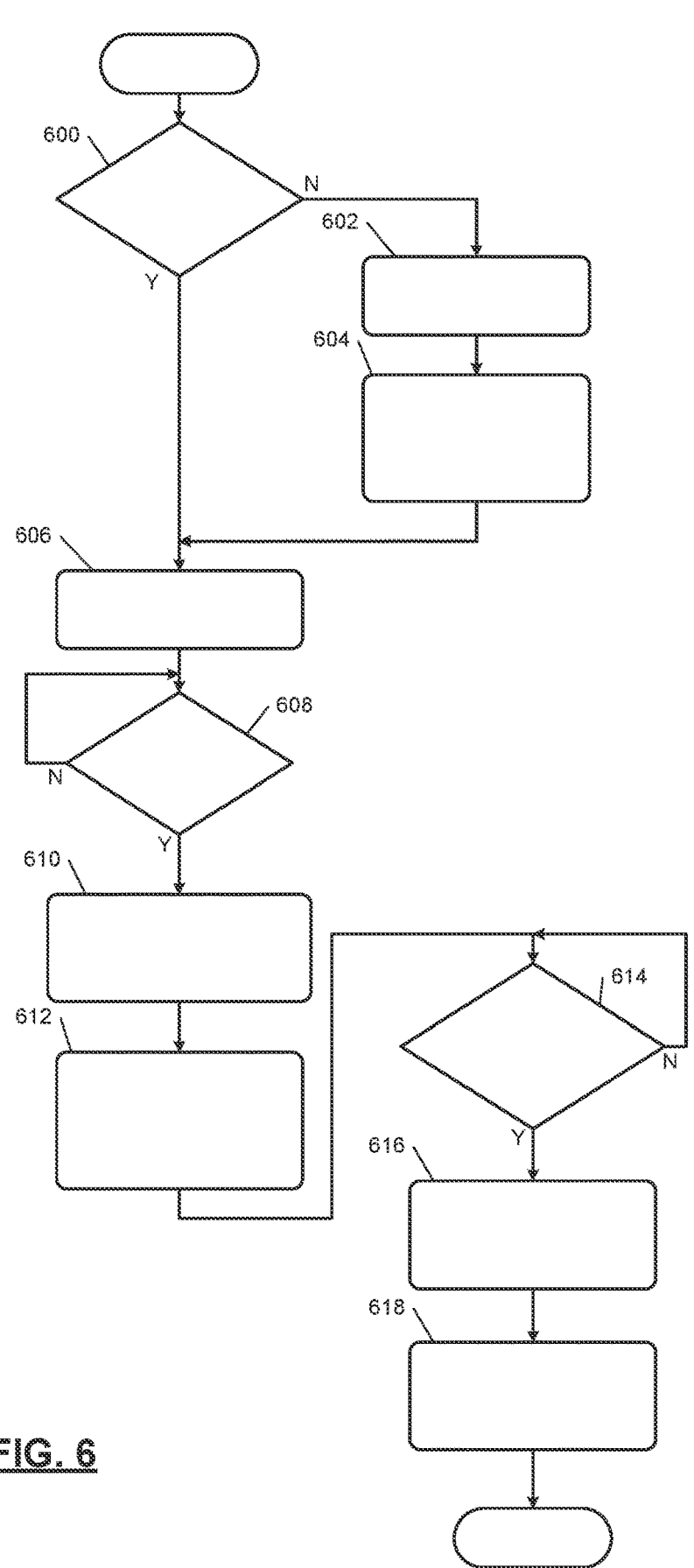
FIG. 6 an example method of operating a device to be branded and configured in accordance with the present disclosure.

FIG. 6 shows a method of operating a device to be branded and configured. The following operation may be performed by any device being branded. The following operations may be performed by the control module of the device being branded during the branding phase.

At 600, the control module determines whether valid branding IDs (e.g., MAC address, IP address, diagnostic ID) have been provided for the device during calibration. If not, operation 602 is performed, otherwise operation 606 is performed.

At 602, the control module obtains the local hardware ID of the device from the NVM of the device. At 604, the control module, based on the hardware ID, self selects branding IDs from a look-up table. The look-up table may have been provided by the branding module 102 and/or stored in the NVM of the device.

At 606, the control module stores in a memory stack of the RAM of the device the branding IDs. At 608, the control module determines whether a branding discovery request has been received. If yes, operation 610 is performed. At 610, the control module selects the connector (or socket) of the Ethernet switch with the UDP port identified in the branding discovery request. At 612, the control module responds to the branding discovery request with the branding IDs via the selected connector.

At 614, the control module determines whether a branding configuration request has been received. If yes, operation 616 is performed. At 616, the control module reconfigures the memory stack with new branding IDs, which may be stored in the RAM of the device. This includes replacing previously stored branding IDs and/or previously stored IDs with the new branding IDs, which were received from the branding module. At 618, the control module responds to the branding configuration request with the new branding IDs.

Figure 7:
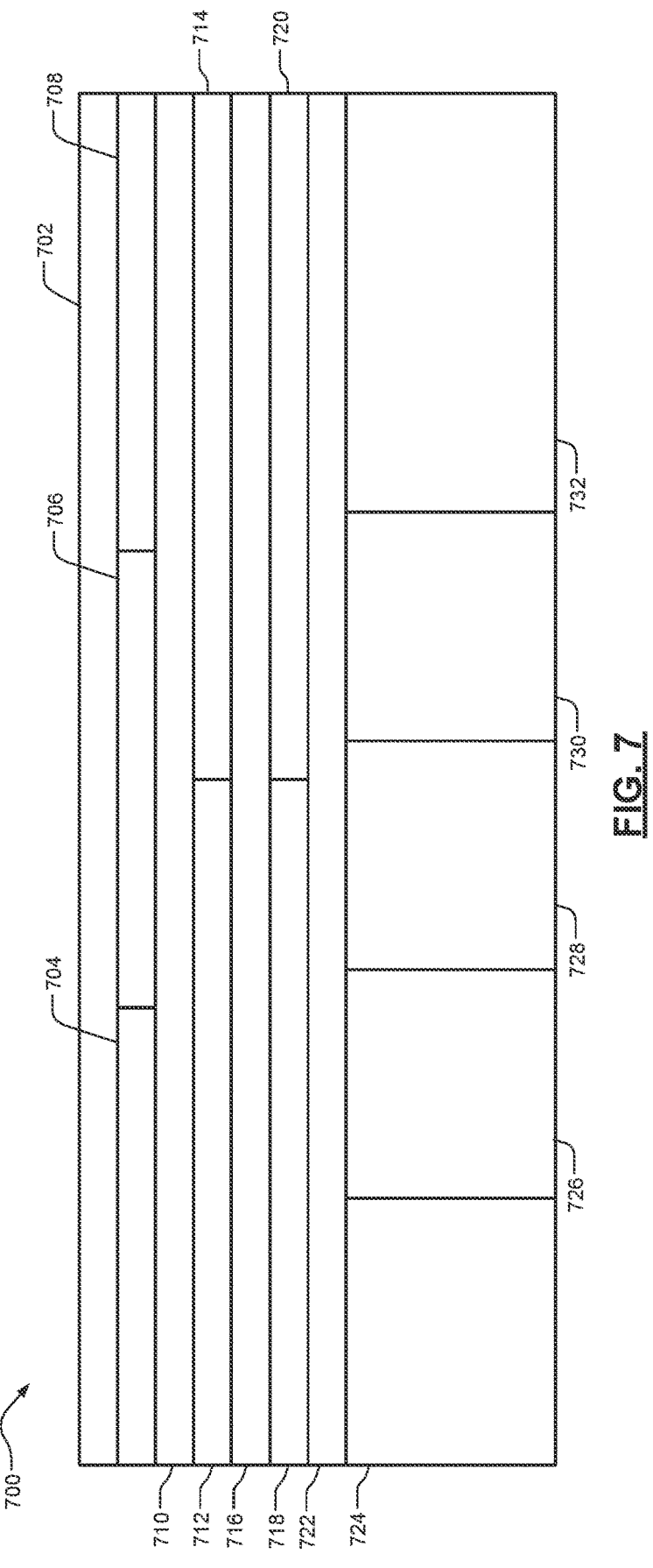
FIG. 7 is an example branding message format diagram in accordance with the present disclosure.

FIG. 7 shows a branding message format diagram 700 illustrating an example format of a branding message sent between the branding module 102 and one of the devices being branded. The branding message may include a layer 2 Ethernet frame header 702, a destination MAC address 704, a source MAC address 706, a VLAN ID 708, a layer 3 Internet protocol header (IPv4) 710, a source IP address 712, a destination IP address 714, a layer 4 UDP datagram header 716, a source port ID 718, a destination port ID 720, a branding message 722, a message type 724, a MAC address 726, an IP address 728, a diagnostic ID 730, and a branding status 732. The message type indicates whether the message is a discover request, a discovery response, a configuration request, or a configuration response. The branding status indicates whether the corresponding device is branded, is in a temporary and ready for programming state, in a confirmed and ready for programming state, is programmed, or has received an invalid request. This format may be used for any of the above-described frames, packets, and signals sent between the branding module 102 and the devices of FIGS. 1-3. This format may also be used for messages sent between the testing device 134 and the devices of FIGS. 1-3.

The above-described examples allow multiple devices (e.g., ECUs) to have the same or similar hardware and be dynamically configured, i.e., branded, configured and programmed when plugged into a vehicle architecture. The branding, configuring and programming allows the devices to perform different respective functional roles. This process significantly reduces the hardware design and manufacturing costs and minimizes the software variants and complexity. The disclosed examples also allow multiple devices to be branded concurrently to reduce manufacturing time. The examples further provide a robust fault recovery if any failure happens during reprogramming.

The described process may be used during manufacturing of a vehicle or when service is done on the vehicle. During servicing of the vehicle, a device may be replaced with a new device and/or two devices may be swapped. The above-described process may be performed to brand and reprogram the new device and/or rebrand and reprogram the swapped devices. The process may be implemented when a new device with stored default software content is plugged into a vehicle for a first time. As an example, this process may be performed when a short-range radar module is plugged into a vehicle Ethernet network and is to perform as a left front radar device for a collision avoidance application.

In such case, this radar module is branded as the "left front position radar device" with specific identity information, calibrations and software content. The process may also be implemented when an already configured, i.e., branded device, is swapped from one functional role to another functional role and thus is re-branded with different identity and functional software content.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C+, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A branding and configuring system for a plurality of devices of a vehicle to be branded, the branding and configuring system comprising:

at least one Ethernet switch comprising a plurality of ports;

a branding module connected to the at least one Ethernet switch and configured to generate new identification information for each of the plurality of devices and send the new identification information via a respective one of the plurality of ports to that device; and the plurality of devices connected respectively to the plurality of ports and comprising a random access memory (RAM) and a non-volatile memory (NVM), each of the plurality of devices is configured to i) at least one of store the corresponding new identification information received from the branding module for that device in the RAM and replace identification information stored in the RAM of that device with the corresponding new identification information in the RAM, ii) based on the new identification information, receive programming from a testing device external from the vehicle to reprogram that device for a dedicated functional role within the vehicle, and iii) perform a confirmation process and based on results of the confirmation process, store the corresponding new identification information and the programming in the NVM of that device.

2. The branding and configuring system of claim 1, wherein the plurality of devices comprise the same hardware and, prior to branding and configuring, the same software.

3. The branding and configuring system of claim 1, wherein at least one of the plurality of devices comprises different hardware than another one of the plurality of devices.

4. The branding and configuring system of claim 1, wherein the branding module sends the new identification information for the plurality of devices to the plurality of devices via the Ethernet switch concurrently.

5. The branding and configuring system of claim 1, wherein the Ethernet switch is configured, based on ternary content-addressable memory rules, to route the new identification information and other messages to the plurality of devices via the plurality of ports.

6. The branding and configuring system of claim 1, wherein the Ethernet switch is configured to route the new identification information and other messages to the plurality of devices via the plurality of ports based on user datagram protocol identifiers of the plurality of ports, which are dedicated respectively for the plurality of devices as a result of being connected to the plurality of ports.

7. The branding and configuring system of claim 1, wherein:

the plurality of ports comprise first connectors;

the plurality of devices are connected to the plurality of ports via cables;

the cables comprise second connectors that connect respectively to the first connectors; and each of the second connectors is compatible with only one of the first connectors.

8. The branding and configuring system of claim 1, wherein:

the branding module is configured to transmit multicast packets or unicast packets to the plurality of devices; and the at least one Ethernet switch is configured to route the multicast packets or the unicast packets to the plurality of ports based on user datagram protocol identifiers of the plurality of ports.

9. The branding and configuring system of claim 1, wherein, during a discovery phase:

the branding module sends discovery requests to the plurality of devices; and each of the plurality of devices, i) based on a corresponding one of the discovery requests, checks if there is valid identity information stored in the NVM of that device, ii) if there is valid identity information, the device self-configures itself using information stored in the NVM of that device, and iii) if there is not valid identity information, the device loads a hardware identifier into the NVM of that device and self-selects a medium access control address, an Internet protocol address and a diagnostic identifier from a table stored in the NVM of that device.

10. The branding and configuring system of claim 9, wherein:

the branding module is configured, subsequent to sending the discovery requests, to send to the plurality of devices branding configuration requests to indicate to the plurality of devices the new identification information of the plurality of devices; and the plurality of devices are configured, based on the branding configuration requests, to change identification information of the plurality of devices with the new identification information.

11. The branding and configuring system of claim 1, wherein:

the branding module is configured to receive from the testing device a branding status request, and respond to the testing device with status of each of the plurality of devices; and the plurality of devices are configured, based on signals received from the testing device in response to the status of each of the plurality of devices, to reprogram the devices.

12. The branding and configuring system of claim 1, wherein the plurality of devices receive signals from the testing device according to a unified diagnostic service protocol to reprogram the devices.

13. A method of branding and configuring a plurality of devices of a vehicle to be branded, the plurality of devices comprising a random access memory (RAM) and a nonvolatile memory (NVM), the method comprising:

generating new identification information at a branding module for each of the plurality of devices and sending the new identification information via a respective one of a plurality of ports of at least one Ethernet switch to that device, wherein the plurality of devices are connected respectively to the plurality of ports; and via each of the plurality of devices, i) at least one of storing the corresponding new identification information received from the branding module for that device in the RAM and replace identification information stored in the RAM of that device with the corresponding new identification information in the RAM, ii) based on the new identification information, receiving programming from a testing device external from the vehicle to reprogram that device for a dedicated functional role within the vehicle, and ill) performing a confirmation process and based on results of the confirmation process, store the corresponding new identification information and the programming in the NVM of that device.

14. The method of claim 13, further comprising sending the new identification information for the plurality of devices to the plurality of devices via the Ethernet switch concurrently.

15. The method of claim 13, further comprising, based on ternary content-addressable memory rules, routing the new identification information and other messages to the plurality of devices via the plurality of ports.

16. The method of claim 13, further comprising routing the new identification information and other messages to the plurality of devices via the plurality of ports based on user datagram protocol identifiers of the plurality of ports, which are dedicated respectively for the plurality of devices as a result of being connected to the plurality of ports.

17. The method of claim 13, wherein:

the plurality of ports comprise first connectors;

the plurality of devices are connected to the plurality of ports via cables;

the cables comprise second connectors that connect respectively to the first connectors; and each of the second connectors is compatible with only one of the first connectors.

18. The method of claim 13, further comprising:

transmitting multicast packets or unicast packets to the plurality of devices; and routing, via the at least one Ethernet switch, the multicast packets or the unicast packets to the plurality of ports based on user datagram protocol identifiers of the plurality of ports.

19. The method of claim 13, further comprising, during a discovery phase:

sending discovery requests to the plurality of devices;

via each of the plurality of devices and based on a corresponding one of the discovery requests, checking if there is valid identity information stored in the NVM of that device, if there is valid identity information, self-configuring that device using information stored in the NVM of that device, if there is not valid identity information, loading a hardware identifier into the NVM of that device and self-selecting a medium access control address, an Internet protocol address and a diagnostic identifier from a table stored in the NVM of that device;

subsequent to sending the discovery requests, sending to the plurality of devices branding configuration requests to indicate to the plurality of devices the new identification information of the plurality of devices; and via the plurality of devices and based on the branding configuration requests, changing identification information of the plurality of devices with the new identification information.

20. The method of claim 13, further comprising:

receiving from the testing device a branding status request at the branding module, and responding to the testing device with status of each of the plurality of devices; and based on signals received from the testing device in response to the status of each of the plurality of devices, reprogramming the devices.

* * * * *